April 18, 1939.  J. E. WESTENBERG  2,154,795
CONTROLLING TEMPERATURE IN EXOTHERMIC REACTIONS
Filed June 15, 1938
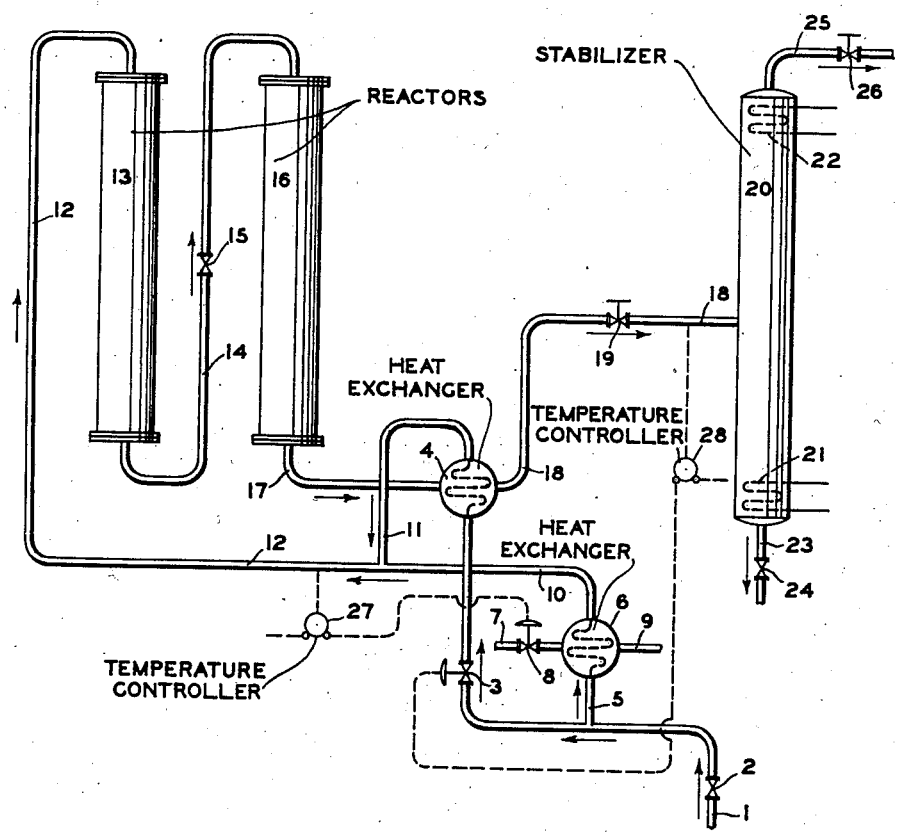
INVENTOR
JOSEPH E. WESTENBERG
BY
ATTORNEY Patented Apr. 18, 1939

2,154,795

UNITED STATES PATENT OFFICE 2,154,795

CONTROLLING TEMPERATURE IN EXOTHERMIC REACTIONS

Joseph E. Westenberg, Chicago, Ill., assignor to Universal Oil Products Company, Chicago, Ill., a corporation of Delaware Application June 15, 1938, Serial No. 213,850

10 Claims. (Cl. 196—10)

The invention particularly relates to a novel and advantageous method and means of definitely controlling the temperature of a stream of reactants being supplied to a reaction zone and definitely controlling the temperature of the products leaving said reaction zone.

In most of the numerous varities of exothermic reactions it is necessary to supply the charging stock to the reaction zone at a fairly constant predetermined temperature. This temperature should be sufficiently high to indicate the desired reaction and sufficiently low to preclude an excessive temperature rise in the reaction zone and thereby preclude or minimize the formation of undesired products. In most cases the temperature to which the resulting reaction products are raised by the heat evolved in the exothermic reaction exceeds that required for their subsequent treatment and it is desirable to recover the excess heat for use in other portions of the system where heat is required. It is, of course an old expedient to pass the charging stock in indirect heat exchange with the reaction products in order to preheat the former and cool the latter, but the heat balance of the system is seldom such that this heat exchange will extract all the excess heat from the reaction products and, at the same time, preheat the charging stock to the specific temperature required.

The invention accomplishes the object of heating the charging stock to the desired temperature and cooling the reaction products to the desired temperature by employing two heat exchange steps operated in parallel arrangement. A regulated portion of the total stream of charging stock is passed in indirect heat exchange with the reaction products, the remaining portion passed in indirect heat exchange with an independent heating medium and the separately heated portions are thence commingled and supplied to the reaction zone. The quantity of charging stock passed in indirect heat exchange with the reaction products is regulated to cool the latter to the desired temperature and the temperature to which the remainder of said charging stock is heated in the other heat exchange step is controlled to produce the desired temperature in the total charging stock entering the reaction zone upon commingling the preheated streams of charging stock from the two heat exchange steps.

The features of the invention may be utilized to advantage in conjunction with any type of reaction system wherein it is desired to preheat the charging stock and cool the reaction products and wherein the reaction products do not contain sufficient excess heat to bring the charging stock to the desired temperature by indirect heat exchange therewith. It is therefore apparent that the adaptability of the invention is not limited to exothermic reactions but that it may also be utilized to advantage in many endothermic reactions wherein the temperature level and quantity of the products leaving the reaction zone is not sufficient to preheat the total charging stock to the desired temperature.

Although, as above stated, the invention is adapted to be used in conjunction with either endothermic or exothermic reactions, it is particularly advantageous as applied to exothermic reaction systems wherein the reaction zone is not controllably cooled and to endothermic reaction systems wherein it is desired to limit direct external heating of the reaction zone.

One specific embodiment of the invention involves its use in conjunction with a system for the catalytic polymerization of normally gaseous olefins, such as propene and/or butenes, to produce liquid products of high antiknock value boiling within the range of gasoline. A description of this type of system and the manner in which the features of the invention may be applied thereto will be used to illustrate the process of the invention in conjunction with the accompanying drawing, but this illustration is not to be construed as a limitation.

The drawing diagrammatically illustrates a catalytic polymerization apparatus of the type above mentioned in which the features of the invention have been incorporated.

Referring to the drawing, the charging stock, which in this case consists of a mixture of olefinic and paraffinic gases containing a substantial quantity of readily polymerizable olefins, is supplied from any suitable source such as, for example, the stabilizer or other gas separating or concentrating equipment of a cracking system, not illustrated, through line 1 and valve 2. A regulated portion of the charging stock is passed through control valve 3 in line 1 to heat exchanger 4 wherein it is preheated by indirect heat exchange with relatively hot reaction products and serves to reduce the temperature of the latter, as will be later described. The remaining portion of the charging stock is directed from line 1 through line 5 to heat exchanger 6 wherein its temperature is increased to the desired degree by indirect heat exchange in this zone with a suitable heating medium supplied thereto through line 7 and control valve 8 and discharged therefrom through line 9.

The stream of charging stock preheated in heat exchanger 6 is directed therefrom through line 10 and commingles in line 12 with the stream of charging stock preheated in heat exchanger 4 and directed therefrom to line 12 through line 11. The resulting commingled stream of preheated charging stock passes through line 12 to reactor 13 and the resulting reaction products pass from reactor 13 through line 14 and valve 15 to reactor 16.

Reactors 13 and 16, in this particular case, are similar reaction zones, each containing a bed of suitable catalytic material such as, for example, what is now known in the art as "solid phosphoric acid catalyst". One or any desired number of such reactors may, of course, be employed in series or in parallel arrangement within the scope of the invention. The use of such reactors, the method of supporting a catalyst bed and the type of catalyst suitable for polymerization of the olefinic components of the charging stock, such as propene and/or butenes, to produce materials of high antiknock value boiling within the range of gasoline, are now well known in the art and do not require illustration or detailed description.

The stream of normally liquid polymers and unconverted components of the gaseous mixture supplied to the system as charging stock are directed from reactor 16 in relatively hot vaporous state through line 17 to heat exchanger 4 wherein they are cooled to the desired temperature by indirect heat exchange with that portion of the charging stock supplied, as previously described, to this zone. The resulting partially cooled conversion products are directed from heat exchanger 4 through line 18 and the valve 19 to stabilizer 20. Valve 19 is provided, in this particular case, for the purpose of reducing the pressure employed in stabilizer 20 relative to that utilized in the reaction zone, although this is not an essential requirement of the process.

The purpose of stabilizer 20 is to liberate from the polymer gasoline regulated quantities of dissolved normally gaseous components and thereby reduce its vapor pressure to the desired degree. This type of treatment is well known and stabilizer 20 may be of any conventional form. In the case here illustrated, heat is supplied to the lower portion of the stabilizer for reboiling the polymer gasoline by passing a suitable heating medium through closed coil 21. Controlled cooling in the upper portion of the stabilizer is accomplished, in the case here illustrated, by passing a suitable cooling medium through closed coil 22. Other conventional reboiling and/or cooling means may, of course, be substituted when desired. Stabilized polymer gasoline of the desired vapor pressure is withdrawn from the lower portion of stabilizer 20 and directed through line 23 and valve 24 to cooling and storage or elsewhere, as desired. The gases supplied as such to stabilizer 20 and gases liberated from the polymer gasoline in this zone are released from the upper portion thereof through line 25 and valve 26 and may be supplied directly to storage or elsewhere, as desired, or they may be first subjected, by well known means not illustrated, to substantially complete or partial condensation.

The quantity of gaseous charging stock passed through heat exchanger 4 is controlled by the regulation of valve 3 in line 1 to decrease the temperature of the conversion products passed through heat exchanger 4 to the desired degree. This temperature is preferably such that the stream of conversion products entering stabilizer 20 is in partially vaporous and partially liquid state, the additional heat required for the desired stabilization being accomplished by reboiling of the stabilizer bottoms either within or external to the stabilizer. When stabilizer 20 is operated at a lower pressure than that employed in heat exchanger 4, the pressure reduction will, of course, accomplish some cooling of the conversion products and account must be taken of this cooling effect in controlling the temperature of the conversion products leaving heat exchanger 4. Preferably, in such cases, the temperature is measured on the low pressure side of valve 19 and valve 3 is adjusted in accordance with the temperature to admit only the required amount of charging stock to heat exchanger 4.

The quantity of heat supplied to heat exchanger 6 to that portion of the charging stock passed through this zone is determined by the temperature of the commingled streams of preheated charging stock passing through line 12, so that the temperature of the charging stock entering the reaction zone is maintained substantially constant. This is accomplished, in the case here ilustrated, by measuring the temperature of the stream of preheated charging stock passing through line 12 and accordingly adjusting valve 8 in line 7 to permit the admission of only the required amount of heating medium to heat exchanger 6.

It will be apparent from the above that by proper regulation of valves 3 and 8 the temperature of the charging stock entering the reaction zone and the temperature of the reaction products entering stabilizer 20 may both be definitely controlled within narrow limits. This may be accomplished by the manual adjustment of valves 3 and 8, the adjustment of valve 3 being determined by the temperature of the commingled streams of charging stock passing through line 12 and the adjustment of valve 8 being determined by the temperature of the reaction products entering stabilizer 20. Conventional automatic control equipment may, however, be employed to accomplish the adjustment of valve 3 in response to minor variations in the temperature of the commingled streams of preheated charging stock in line 12 and to accomplish the adjustment of valve 8 in response to minor variations in the temperature of the reaction products entering the stabilizer. Such controllers are indicated at 27 and 28. Controller 27 is connected with a suitable temperature-sensitive device in line 12 and with valve 8 in such a manner that the contour functions to adjust the opening through the valve in inverse relation to variations in the temperature of the stream passing through line 12. Controller 28 is connected with line 18 and valve 3 and functions to adjust the opening through the valve in direct relation to temperature variations in line 12.

Other suitable controllers, not illustrated, may, of course, be employed in a conventional manner to control any other desired operating conditions in the system such as, for example, the pressure in stabilizer 20 and the top and bottom temperatures in this zone.

As an example of one specific operation of a catalytic polymerization system, such as illustrated and above described, as conducted in accordance with the provisions of the invention:

The charging stock, which is a mixture of normally gaseous hydrocarbons consisting principally of propenes, butenes and the corresponding paraffins, is supplied to the system at a temperature of approximately 100° F. from a debutanizer operated in conjunction with a cracking system, not illustrated. A controlled quantity of the total gaseous charging stock is passed through heat exchanger 4 and therein preheated to a temperature of approximately 425° F. This temperature and quantity will be varied, during the operation, with variations in the temperature and/or quantity of the heated products leaving the reaction zone. The remaining portion of the charging stock is passed through heat exchanger 6 in indirect heat exchange with steam and therein preheated to a temperature of approximately 308° F. This temperature and quantity will also vary with changes in the temperature and/or quantity of the total charging stock as well as with changes in the temperature and/or quantity of the other preheated stream of charging stock, but the temperatures and relative quantities of these two preheated streams are so regulated that, when commingled in line 6 at a superatmosphere pressure of approximately 1000 pounds per square inch, the temperature of the commingled streams is approximately 400° F. The reaction products leave the catalytic reaction zone at a varying temperature of the order of 450° F. and a superatmospheric pressure of about 950 pounds per square inch. They are cooled in heat exchanger 4 by indirect heat exchange with that portion of the charging stock supplied through this zone and the pressure is reduced as the conversion products pass through valve 19 in line 18 to approximately 100 pounds per square inch, which pressure is employed in stabilizer 20. The resulting temperature of the conversion products entering the stabilizer is controlled to remain substantially constant at approximately 200° F.

When, for example, the temperature of the charging stock supplied to the system from the debutanizer decreases and/or when the quantity of total charging stock supplied to the system increases, the temperature in line 12 will begin to decrease and controller 27 functions to increase the supply of heating medium to heat exchanger 6. On the other hand, when the quantity of total charging stock supplied to the system decreases and/or when its temperature increases, controller 27 will function to decrease the quantity of steam supplied to heat exchanger 6. When either of these variations involves a change in the total quantity of charging stock supplied to the system and/or when the quantity of polymerizable olefins supplied to the system varies, it will be reflected in an increased or decreased temperature of the stream of hot conversion products supplied to heat exchanger 4. When this happens controller 28 will function to accordingly increase or decrease the proportion of the total charging stock supplied to heat exchanger 6 and then maintain the temperature of the conversion products entering stabilizer 20 substantially constant. Controller 27 will then compensate for the change in the quantity of charging stock supplied to heat exchanger 4.

As another example of a change in operating conditions which may occur and require compensation, the activity of the catalyst will gradually decrease during prolonged operation of the catalyst bed and result in a decreased temperature of the reaction products supplied to heat exchanger 4. When this occurs, the decreased temperature in the stream of conversion products entering stabilizer 20 will cause controller 28 to restrict the opening through valve 3, thereby decreasing the flow of charging stock through heat exchanger 4 and increasing its flow through heat exchanger 6. This will result in a momentary temperature decrease in line 12, causing controller 27 to open valve 8 and increase the flow of heating medium through heat exchanger 6. In this manner the desired temperatures are re-established in lines 12 and 18.

I claim as my invention:

1. A method of maintaining a substantially constant temperature in a stream of reactants entering a reaction zone and maintaining an independent, substantially constant temperature in a stream of reaction products discharged from said zone, which comprises passing a portion of said reactants in indirect heat exchange with said reaction products, passing the remaining portion of said reactants in indirect heat exchange with a separate heating medium, commingling the streams of reactants discharged from said heat exchange steps, supplying the commingled stream to the reaction zone, controlling the quantity of the first named portion in response to the temperature of the reaction products discharged from the first mentioned heat exchange step, and controlling the heat supplied to said remaining portion in the second heat exchange step in response to the temperature of said commingled stream of reactants being supplied to the reaction zone.

2. A method of maintaining a substantially constant temperature in a stream of reactants entering a reaction zone and maintaining an independent, substatially constant temperature in a stream of reaction products discharged from said zone which comprises, passing a portion of said reactants in indirect heat exchange with said reaction products, passing the remaining portion of said reactants in indirect heat exchange with a separate heating medium, varying the quantity of the first named portion in accordance with variations in the temperature of the stream of reaction products discharged from the first mentioned heat exchange step, and varying the heat supplied to said remaining portion in the second heat exchange step in accordance with variations in the temperature of said commingled stream of reactants being supplied to the reaction zone.

3. A method of maintaining a substantially constant temperature in a stream of reactants entering a reaction zone and maintaining an independent, substantially constant temperature in a stream of reaction products discharged from said zone which comprises, passing a portion of said reactants in indirect heat exchange with said reaction products, passing the remaining portion of said reactants in indirect heat exchange with a separate heating medium, varying the quantity of the first named portion in direct relation to variations in the temperature of the reaction products discharged from the first named heat exchange step, and varying the heat supplied to said remaining portion in the second mentioned heat exchange step in inverse relation to variations in the temperature of said commingled stream of reactants supplied to the reaction zone.

4. A method of maintaining a substantially constant temperature in a stream of reactants entering a reaction zone and maintaining an independent, substantially constant temperature in a stream of reaction products discharged from said zone which comprises, passing a portion of said reactants in indirect heat exchange with said reaction products, passing the remaining portion of said reactants in indirect heat exchange with a separate heating medium, controlling the quantity of said first named portion in response to the temperature of the conversion products discharged from the first named heat exchange step, and controlling the quantity of said separate heating medium supplied to the second mentioned heat exchange step in response to the temperature of said commingled stream of conversion products being supplied to the reaction zone.

5. A method of maintaining a substantially constant temperature in a stream of reactants entering a reaction zone and maintaining an independent, substantially constant temperature in a stream of reaction products discharged from said zone which comprises, passing a portion of said reactants in indirect heat exchange with said reaction products, passing the remaining portion of said reactants in indirect heat exchange with a separate heating medium, varying the quantity of said first named portion in accordance with variations in the temperature of the reaction products discharged from the first named heat exchange step, and varying the quantity of said separate heating medium supplied to the second heat exchange step in accordance with variations in the temperature of the commingled stream of reactants being supplied to the reaction zone.

6. A method of maintaining a substantially constant temperature in a stream of reactants entering a reaction zone and maintaining an independent, substantially constant temperature in a stream of reaction products discharged from said zone which comprises, passing a portion of said reactants in indirect heat exchange with said reaction products, passing the remaining portion of said reactants in indirect heat exchange with a separate heating medium, varying the quantity of the first named portion in direct relation to variations in the temperature of the reaction products discharged from the first mentioned heat exchange step, and varying the quantity of said separate heating medium supplied to the second mentioned heat exchange step in inverse relation to variations in the temperature of the commingled stream of reactants being supplied to the reaction zone.

7. In a process wherein charging stock comprising olefinic hydrocarbons is subjected to polymerization to convert the same into substantial yields of desirable polymers, the method of temperature control which comprises, passing in indirect heat exchange with hot conversion products discharged from the zone of said polymerization a portion of said charging stock, the quantity of which is regulated to cool said conversion products to a predetermined substantially constant temperature, passing the remaining portion of the charging stock in indirect heat exchange with a separate heating medium, commingling the resultant heated charging stock from both heat exchange steps, supplying the commingled stream to the zone of said polymerization, and controlling the quantity of heat supplied to that portion of the charging stock passed through the second mentioned heat exchange step to give a predetermined substantially constant temperature in said commingled stream.

8. In a process for the catalytic polymerization of normally gaseous olefins wherein a stream of charging stock comprising said normally gaseous olefins is heated to a predetermined substantially constant temperature, thence passed through a zone of exothermic reaction, maintained at superatmospheric pressure, in contact with a polymerizing catalyst, resultant conversion products discharged in heated state from the reaction zone, controllably cooled to a predetermined substantially constant temperature and thence separated into the desired fractions, the improved method of temperature control which comprises, effecting a portion of said controlled cooling of the conversion products by materially reducing the pressure in the zone of said separation relative to that employed in the reaction zone, effecting the remaining portion of said controlled cooling of the conversion products by passing the same in indirect heat exchange with a portion of said stream of charging stock, controlling the quantity of said charging stock supplied to said heat exchange step in response to the temperature of the stream of said conversion products subsequent to both of the cooling steps, passing the remaining portion of said stream of charging stock in indirect heat exchange with a separate heating medium, commingling the thus separately heated portions of the charging stock, supplying the resulting commingled stream of charging stock to the reaction zone, and controlling the quantity of heat supplied to the charging stock in the second heat exchange step in response to the temperature of said commingled stream.

9. An apparatus of the character described comprising, in combination, a reaction zone, means for supplying reactants thereto, means for discharging reaction products therefrom, means including two heat exchange zones for heating said reactants prior to their introduction into said reaction zone, means for supplying a separate portion of said reactants to each of the heat exchange zones, means for commingling the heated reactants from each of said heat exchange zones and supplying the commingled stream to the reaction zone, means for passing the hot conversion products discharged from said reaction zone through one of said heat exchange zones, means for passing a separate heating medium through the other heat exchange zone, means, responsive to the temperature of the conversion products discharged from the heat exchange zone to which said hot conversion products are supplied, for controlling the quantity of said reactants supplied to the same heat exchanger zone and means, responsive to the temperature of said commingled stream of heated reactants, for controlling the temperature to which that portion of said reactants supplied to the other heat exchange step is heated therein.

10. An apparatus of the character described comprising, in combination, a zone of indirect heat exchange, means for passing a portion of a stream of charging stock therethrough, a separate zone of indirect heat exchange, means for passing the remaining portion of said stream of charging stock therethrough, means for commingling said portions of the charging stock passed through the two heat exchange zones, a reaction zone, means for supplying the commingled stream of charging stock to the reaction zone, means for effecting conversion of said reactants in the reaction zone at elevated temperature and substantial superatmospheric pressure, means for discharging resultant hot conversion products from the reaction zone and passing the same as a heating medium through the first mentioned zone of indirect heat exchange, means for discharging resultant partially cooled conversion products from the first named heat exchange zone, substantially reducing the pressure imposed thereon and thereafter separating the same into the desired components, means for passing a separate heating medium through the second mentioned heat exchange zone, means responsive to the temperature of said conversion products following said pressure reduction for controlling the quantity of reactants supplied to the first named heat exchange zone and means responsive to the temperature of said commingled stream of reactants for controlling the heat supplied to the reactants by said separate heating medium in the second mentioned heat exchange zone.

JOSEPH E. WESTENBERG.